United States Patent
Mukae et al.

(10) Patent No.: US 11,739,206 B2
(45) Date of Patent: Aug. 29, 2023

(54) RESIN COMPOSITION AND MOLDED ARTICLE

(71) Applicant: DAIKIN INDUSTRIES, LTD., Osaka (JP)

(72) Inventors: Hirofumi Mukae, Osaka (JP); Hideki Kono, Osaka (JP); Masaji Komori, Osaka (JP); Hiroshi Ito, Yamagata (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 114 days.

(21) Appl. No.: 17/270,700

(22) PCT Filed: Aug. 23, 2019

(86) PCT No.: PCT/JP2019/032948
§ 371 (c)(1),
(2) Date: Feb. 23, 2021

(87) PCT Pub. No.: WO2020/045260
PCT Pub. Date: Mar. 5, 2020

(65) Prior Publication Data
US 2021/0332229 A1    Oct. 28, 2021

(30) Foreign Application Priority Data
Aug. 28, 2018 (JP) .................. 2018-159219

(51) Int. Cl.
| C08L 27/20 | (2006.01) |
| B29C 45/00 | (2006.01) |
| C08L 27/18 | (2006.01) |
| C08K 3/38 | (2006.01) |
| B29K 27/18 | (2006.01) |

(52) U.S. Cl.
CPC .......... *C08L 27/20* (2013.01); *B29C 45/0001* (2013.01); *C08K 3/38* (2013.01); *C08L 27/18* (2013.01); *B29K 2027/18* (2013.01); *C08K 2003/385* (2013.01); *C08K 2201/005* (2013.01)

(58) Field of Classification Search
None
See application file for complete search history.

(56) References Cited

U.S. PATENT DOCUMENTS

| 2008/0057333 | A1 | 3/2008 | Chu et al. |
| 2015/0252242 | A1 | 9/2015 | Pham et al. |
| 2018/0051158 | A1* | 2/2018 | Nam ........................ C08K 3/38 |

FOREIGN PATENT DOCUMENTS

| JP | 2015-168783 A | 9/2015 |
| JP | 2016-098301 A | 5/2016 |
| TW | 200812025 A | 3/2008 |
| WO | 2021/010320 A1 | 1/2021 |

OTHER PUBLICATIONS

Showa Denko UHP-G1H datasheet (Year: 2018).*
Azo Materials PFA density (Year: 2004).*
Extended European Search Report dated Mar. 18, 2022 in counterpart European Application No. 19855612.8.
International search report for PCT/JP2019/032948 dated Oct. 15, 2019.
International Preliminary Report on Patentability (with Translation of Written Opinion) dated Mar. 2, 2021, issued by the International Bureau in application No. PCT/JP2019/032948.

* cited by examiner

*Primary Examiner* — Ling Siu Choi
*Assistant Examiner* — Huihong Qiao
(74) *Attorney, Agent, or Firm* — Sughrue Mion, PLLC

(57) ABSTRACT

A resin composition and a molded article. The resin composition contains a fluororesin and boron nitride particles, the fluororesin being present in an amount of 35 to 70% by mass and the boron nitride particles being present in an amount of 30 to 65% by mass, each relative to the resin composition, the resin composition having a melt flow rate of 5.0 g/10 min or more.

9 Claims, No Drawings

RESIN COMPOSITION AND MOLDED ARTICLE

CROSS-REFERENCE TO RELATED APPLICATIONS

This application is a National Stage of International Application No. PCT/JP2019/032948 filed Aug. 23, 2019, which claims priority under U.S.C. § 119(a) to Japanese Patent Application No. 2018-159219 filed on Aug. 28, 2018.

TECHNICAL FIELD

The disclosure relates to resin compositions and molded articles.

BACKGROUND ART

Power generated in the electrical and electronic device field and the automobile field, for example, becomes higher, which increases the amount of heat. To achieve better heat dissipation properties, heat dissipation parts with excellent thermal conductivity are required.

Patent Literature 1 discusses a resin composition containing a hot melt fluororesin and boron nitride particles including predetermined particles (A) and predetermined particles (B) at a predetermined ratio.

Patent Literature 2 discusses a resin composition containing a thermoplastic resin and boron nitride containing spherical boron nitride particles and flat boron nitride particles at a predetermined ratio.

CITATION LIST

Patent Literature

Patent Literature 1: JP 2016-98301 A
Patent Literature 2: JP 2015-168783 A

SUMMARY OF INVENTION

Technical Problem

The disclosure aims to provide a resin composition having excellent heat dissipation properties as well as excellent moldability, and a molded article.

Solution to Problem

The disclosure relates to a resin composition containing a fluororesin and boron nitride particles, the fluororesin being present in an amount of 35 to 70% by mass and the boron nitride particles being present in an amount of 30 to 65% by mass, each relative to the resin composition, the resin composition having a melt flow rate of 5.0 g/10 min or more.

The boron nitride particles preferably have a ratio of a proportion (b) of particles having a particle size of 24.6 to 29.4 μm to a proportion (a) of particles having a particle size of 14.6 to 20.6 μm ((b)/(a)) of 1.0 or higher.

The boron nitride particles preferably include particles having a particle size of 14.6 to 20.6 μm in a proportion (a) of 5.0% or less.

The boron nitride particles preferably include particles having a particle size of 24.6 to 29.4 μm in a proportion (b) of 10.0% or less.

The fluororesin is preferably a melt-fabricable fluororesin.

The fluororesin preferably includes at least one selected from the group consisting of a tetrafluoroethylene/perfluoro (alkyl vinyl ether) copolymer, a tetrafluoroethylene/hexafluoropropylene copolymer, and an ethylene/tetrafluoroethylene copolymer.

The resin composition preferably has a thermal conductivity of 1.5 W/m·K or higher.

The resin composition preferably has a tensile strain at break of 1.0% or higher.

The disclosure also relates to a molded article obtainable by injection molding the resin composition.

Advantageous Effects of Invention

The disclosure can provide a resin composition having excellent heat dissipation properties as well as excellent moldability, and a molded article.

DESCRIPTION OF EMBODIMENTS

The disclosure is specifically described below.

The disclosure relates to a resin composition containing a fluororesin and boron nitride particles, the fluororesin being present in an amount of 35 to 70% by mass and the boron nitride particles being present in an amount of 30 to 65% by mass, each relative to the resin composition, the resin composition having a melt flow rate of 5.0 g/10 min or more.

Conventionally, a fluororesin mixed with a large amount of a heat dissipation filler such as boron nitride for increased heat dissipation properties has significantly high melt viscosity and thus has difficulty in molding, especially in injection molding, which significantly limits applications of the resin.

The resin composition of the disclosure has the above features and thus has excellent heat dissipation properties as well as excellent moldability. In particular, the resin composition can be subjected to injection molding and can be used for versatile applications.

The resin composition of the disclosure also has excellent toughness and excellent heat resistance.

The resin composition has a melt flow rate (MFR) of 5.0 g/10 min or more. A resin composition having a MFR within the above range has excellent moldability. In particular, such a resin composition has sufficient injection moldability.

The MFR of the resin composition is preferably 7.0 g/10 min or more, more preferably 10.0 g/10 min or more, while preferably 100 g/10 min or less, more preferably 70 g/10 min or less, still more preferably 50 g/10 min or less.

The MFR of the resin composition is a value measured with a die having a diameter of 2.1 mm and a length of 8 mm in conformity with ASTM D-1238 at 372° C. and 5 kg load.

The fluororesin is preferably a melt-fabricable fluororesin. The term "melt-fabricable" as used herein means that a polymer can be processed in a molten state with a conventional processing device such as an extruder or an injection molding machine.

The fluororesin preferably has a melting point of 100° C. to 360° C., more preferably 140° C. to 350° C., still more preferably 160° C. to 320° C.

The melting point as used herein is a temperature corresponding to the maximum value on a heat-of-fusion curve drawn using a differential scanning calorimeter (DSC) at a temperature-increasing rate of 10° C./min.

The fluororesin preferably has a melt flow rate (MFR) of 10 g/10 min or more, more preferably 20 g/10 min or more, while preferably 200 g/10 min or less, more preferably 100 g/10 min or less.

The MFR of the fluororesin is a value obtained as the mass (g/10 min) of the polymer flowed out of a nozzle having an inner diameter of 2 mm and a length of 8 mm per 10 minutes in conformity with ASTM D1238 at a predetermined temperature (e.g., 372° C. for PFA and FEP described later and 297° C. for ETFE described later) and a predetermined load (e.g., 5 kg for PFA, FEP, and ETFE).

Examples of the fluororesin include a tetrafluoroethylene (TFE)/perfluoro(alkyl vinyl ether) (PAVE) copolymer (PFA), a TFE/hexafluoropropylene (HFP) copolymer (FEP), an ethylene (Et)/TFE copolymer (ETFE), an Et/TFE/HFP copolymer (EFEP), polychlorotrifluoroethylene (PCTFE), a chlorotrifluoroethylene (CTFE)/TFE copolymer, an Et/CTFE copolymer, polyvinyl fluoride (PVF), and polyvinylidene fluoride (PVDF).

In particular, the fluororesin preferably includes at least one selected from the group consisting of PFA, FEP, and ETFE, more preferably includes at least one selected from the group consisting of PFA and FEP, and is still more preferably PFA.

The fluororesin is also preferably a perfluororesin.

The PFA is not limited and is preferably a copolymer having a mole ratio of a TFE unit to a PAVE unit (TFE unit/PAVE unit) of 70/30 or higher and lower than 99/1, more preferably 70/30 or higher and 98.9/1.1 or lower, still more preferably 80/20 or higher and 98.9/1.1 or lower. Too small an amount of the TFE unit tends to reduce the mechanical properties, while too large an amount thereof tends to excessively increase the melting point to reduce the moldability. The PFA is also preferably a copolymer containing 0.1 to 10 mol % of a monomer unit derived from a monomer copolymerizable with TFE and PAVE and 90 to 99.9 mol % of the total of the TFE unit and the PAVE unit. Examples of the monomer copolymerizable with TFE and PAVE include HFP, a vinyl monomer represented by $CZ^3Z^4=CZ^5(CF_2)_nZ^6$ (wherein $Z^3$, $Z^4$, and $Z^5$ are the same as or different from each other and are each a hydrogen atom or a fluorine atom, $Z^6$ is a hydrogen atom, a fluorine atom, or a chlorine atom, and n is an integer of 2 to 10), and an alkyl perfluorovinyl ether derivative represented by $CF_2=CF-OCH_2-Rf^7$ (wherein $Rf^7$ is a C1-C5 perfluoroalkyl group).

The PFA preferably has a melting point of 180° C. to lower than 324° C., more preferably 230° C. to 320° C., still more preferably 280° C. to 320° C.

The FEP is not limited and is preferably a copolymer having a mole ratio of a TFE unit to a HFP unit (TFE unit/HFP unit) of 70/30 or higher and lower than 99/1, more preferably 70/30 or higher and 98.9/1.1 or lower, still more preferably 80/20 or higher and 98.9/1.1 or lower. Too small an amount of the TFE unit tends to reduce the mechanical properties, while too large an amount thereof tends to excessively increase the melting point to reduce the moldability. The FEP is also preferably a copolymer containing 0.1 to 10 mol % of a monomer unit derived from a monomer copolymerizable with TFE and HFP and 90 to 99.9 mol % of the total of the TFE unit and the HFP unit. Examples of the monomer copolymerizable with TFE and HFP include PAVE and an alkyl perfluorovinyl ether derivative.

The FEP preferably has a melting point lower than the melting point of the PTFE. The melting point is preferably 150° C. to lower than 324° C., more preferably 200° C. to 320° C., still more preferably 240° C. to 320° C.

The ETFE is preferably a copolymer having a mole ratio of a TFE unit to an ethylene unit (TFE unit/ethylene unit) of 20/80 or higher and 90/10 or lower. The mole ratio is more preferably 37/63 or higher and 85/15 or lower, still more preferably 38/62 or higher and 80/20 or lower. The ETFE may be a copolymer containing TFE, ethylene, and a monomer copolymerizable with TFE and ethylene. Examples of the copolymerizable monomer include monomers represented by the following formulas:

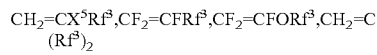

$$CH_2=CX^5Rf^3, CF_2=CFRf^3, CF_2=CFORf^3, CH_2=C(Rf^3)_2$$

(wherein $X^5$ is a hydrogen atom or a fluorine atom, and $Rf^3$ is a fluoroalkyl group optionally containing an ether bond). Preferred examples among these include fluorine-containing vinyl monomers represented by $CF_2=CFRf^3$, $CF_2=CFORf^3$, and $CH_2=CX^5Rf^3$, more preferred examples include HFP, perfluoro(alkyl vinyl ether) represented by $CF_2=CF-ORf^4$ (wherein $Rf^4$ is a C1-C5 perfluoroalkyl group), and a fluorine-containing vinyl monomer represented by $CH_2=CX^5Rf^3$, wherein $Rf^3$ is a C1-C8 fluoroalkyl group. The monomer copolymerizable with TFE and ethylene may be an aliphatic unsaturated carboxylic acid such as itaconic acid or itaconic anhydride. The amount of the monomer copolymerizable with TFE and ethylene is preferably 0.1 to 10 mol %, more preferably 0.1 to 5 mol %, particularly preferably 0.2 to 4 mol %, relative to the fluorine-containing polymer.

The ETFE preferably has a melting point of 140° C. to lower than 324° C., more preferably 160° C. to 320° C., still more preferably 195° C. to 320° C.

The amounts of the respective monomer units of the described copolymers can be calculated by appropriate combination of NMR, FT-IR, elemental analysis, and X-ray fluorescence analysis according to the type of the monomer.

The fluororesin is present in an amount of 35 to 70% by mass relative to the resin composition. The amount of the fluororesin is preferably 45% by mass or more, more preferably 48% by mass or more, still more preferably 50% by mass or more, while preferably 65% by mass or less, more preferably 62% by mass or less.

The boron nitride particles contained in the resin composition are preferably hexagonal boron nitride (hBN) particles.

The boron nitride particles contained in the resin composition preferably have a 50% particle size (D50) of 3.0 μm or smaller, more preferably 2.8 μm or smaller, while preferably 2.0 μm or greater, more preferably 2.2 μm or greater.

Controlling the 50% particle size of the boron nitride particles contained in the resin composition within the above range allows the MFR of the resin composition to fall within the above range, whereby the resin composition has excellent injection moldability. In addition, the proportion of relatively large particles is low, which allows the stress to be distributed and allows the resin composition to have increased tensile strain at break and improved toughness.

The 50% particle size can be determined from particle size distribution measured with a laser diffraction particle size distribution analyzer.

The particle size distribution of the boron nitride particles as used herein is determined with a laser diffraction particle size distribution analyzer (RODOS T4.1, available from Sympatec GmbH) under the following conditions.

Measurement Conditions

Measurement range: R1 (0.18 to 35 μm)
Dispersion pressure: 3 bar
Sample amount: 1 g The boron nitride particles contained in the resin composition preferably have a 90% particle size (D90) of 9.0 μm or smaller, more preferably 8.0 µm or smaller, still more preferably 7.0 µm or smaller, while preferably 3.0 µm or greater, more preferably 4.0 µm or greater, still more preferably 5.0 µm or greater.

Such a 90% particle size allows the resin composition to achieve both of the heat dissipation properties and the moldability at higher levels.

The 90% particle size can be determined from particle size distribution measured with a laser diffraction particle size distribution analyzer.

The boron nitride particles contained in the resin composition include particles having a particle size of 14.6 to 20.6 µm in a proportion (a) of preferably 5.0% or less, more preferably 4.0% or less, still more preferably 3.0% or less, further more preferably 2.0% or less, particularly preferably 1.0% or less. The proportion (a) may be 0.01% or more.

Such a proportion (a) allows the resin composition to achieve both of the heat dissipation properties and the moldability at higher levels.

The proportion (a) can be determined from particle size distribution measured with a laser diffraction particle size distribution analyzer.

The boron nitride particles contained in the resin composition include particles having a particle size of 24.6 to 29.4 µm in a proportion (b) of preferably 10.0% or less, more preferably 5.0% or less, still more preferably 2.0% or less, particularly preferably 1.5% or less. The proportion (b) may be 0.1% or more.

Such a proportion (b) allows the resin composition to achieve both of the heat dissipation properties and the moldability at higher levels.

The proportion (b) can be determined from particle size distribution measured with a laser diffraction particle size distribution analyzer.

The boron nitride particles contained in the resin composition preferably have a ratio of the proportion (b) of particles having a particle size of 24.6 to 29.4 µm to the proportion (a) of particles having a particle size of 14.6 to 20.6 µm ((b)/(a)) of 1.0 or higher, more preferably 1.1 or higher, while preferably 20.0 or lower, more preferably 10.0 or lower, still more preferably 5.0 or lower.

Controlling the ratio (b)/(a) of the boron nitride particles contained in the resin composition within the above range allows the MFR of the resin composition to fall within the above range, whereby the resin composition has excellent injection moldability. In addition, the resin composition contains a certain amount of relatively large particles having a particle size of 24.6 to 29.4 µm which contribute to thermal conductivity, and thus can have increased thermal conductivity and improved heat dissipation properties.

The ratio can be calculated based on the proportions (a) and (b) determined from particle size distribution measured with a laser diffraction particle size distribution analyzer.

The boron nitride particles contained in the resin composition preferably include substantially no particles having a particle size of 35.0 µm or greater, more preferably include substantially no particles having a particle size of 30.0 µm or greater.

Such particles can allow the resin composition to achieve both of the heat dissipation properties and the moldability at higher levels.

That the boron nitride particles include substantially no particles having a particle size within the above range means that the proportion of particles having a particle size within the above range in particle size distribution measured with a laser diffraction particle size distribution analyzer is 0.1% or less.

In the resin composition having a particle size distribution of the boron nitride particles with the above ranges, the boron nitride particles can be densely present in the resin composition, and thus can reduce an increase in melt viscosity. In addition, the resin composition contains relatively large boron nitride particles and thus exhibits excellent thermal conductivity. As a result, the resin composition has excellent heat dissipation properties and maintains fluidity (has excellent moldability).

The particle size distribution of the boron nitride particles in the resin composition as used herein may be particle size distribution of residual boron nitride particles after ashing the resin composition.

The boron nitride particles are present in an amount of 30 to 65% by mass relative to the resin composition. The amount is preferably 35% by mass or more, more preferably 38% by mass or more, while preferably 60% by mass or less, more preferably 55% by mass or less.

The resin composition of the disclosure has excellent moldability even when containing a relatively large amount of the boron nitride particles as described above.

The resin composition of the disclosure may contain a different component according to need. Examples of the different component include, but are not limited to, fibrous reinforcing materials such as whiskers of a substance such as potassium titanate, glass fibers, asbestos fibers, carbon fibers, ceramic fibers, potassium titanate fibers, aramid fibers, and other high strength fibers; inorganic fillers such as talc, mica, clay, carbon powder, graphite, and glass beads; colorants; generally used inorganic or organic fillers such as flame retarders; lubricants such as silicone oil and molybdenum disulfide; pigments; conductive agents such as carbon black; impact resistance improvers such as rubber; glidants such as magnesium stearate; ultraviolet absorbers such as benzotriazole compounds; and other additives.

These additives each may be added within the range where the effects of the application are not impaired.

The resin composition of the disclosure can be produced by, for example, mixing the fluororesin and the boron nitride particles, and optionally any of the different components according to need. The mixing can be performed with a uniaxial or biaxial extruder.

The resin composition is preferably produced by melt kneading in order to achieve both of the heat dissipation properties and the moldability at higher levels.

In the case of producing the resin composition by melt kneading, aggregated boron nitride particles are preferably used as raw boron nitride particles. Melt kneading such raw boron nitride particles and the fluororesin can easily control the MFR of the resulting resin composition within the above range. Such melt kneading can also easily control the particle size distribution of the boron nitride particles in the resin composition so as to include the above preferred ranges.

The aggregated particles are those in which primary boron nitride particles are aggregated.

The raw boron nitride particles preferably have an aspect ratio (longest diameter/shortest diameter) of 1.0 to 3.0, more preferably 1.0 to 2.5.

The aspect ratio can be calculated from the longer diameter and the shorter diameter measured with a scanning electron microscope (SEM) and is determined as the average aspect ratio of 30 samples.

Specific examples of the raw boron nitride particles include UHP-G1H available from Showa Denko K.K., CF600 available from Momentive, and FS-3 available from Mizushima Ferroalloy Co., Ltd.

The temperature for the melt kneading is preferably higher than the melting point of the fluororesin, more preferably higher than the melting point of the fluororesin by 5° C. or more.

The resin composition may be in any form such as powder, granules, and pellets, and is preferably in the form of pellets so as to be easily subjected to injection molding.

The resin composition of the disclosure preferably has a thermal conductivity of 1.5 W/m·K or higher, more preferably 2.0 W/m·K or higher, still more preferably 2.5 W/m·K or higher, particularly preferably 3.0 W/m·K or higher. A thermal conductivity within the above range allows the resin composition to have better heat dissipation properties.

The thermal conductivity can be calculated as the product of the thermal diffusivity, the specific heat capacity, and the density measured by the following methods.

Thermal Diffusivity

Device: Ai phase mobile 1 available from ai-Phase Co., Ltd.
Measurement temperature: 25° C.
Sample: 0.5-mm t plate obtained by press molding
The measurement is performed with N=3, and the average value is taken as the thermal diffusivity.

Conditions for Press Molding the Samples

Device: hot press machine IMC-11FA available from Imoto machinery Co., Ltd.
Molding temperature: 360° C.
Pressure: 10 MPa
Pressing time: 2 minutes Specific Heat Capacity The measurement is performed in conformity with JIS K 7123 and the value at 25° C. is taken as the specific heat capacity.

Density

The measurement is performed in conformity with JIS Z 8807.

The resin composition of the disclosure is preferably a resin composition that can provide a specimen in conformity with ASTM D790 by injection molding using a 15 t injection molding machine (M26/15B available from Sumitomo Heavy Industries, Ltd.) at a cylinder temperature of 380° C. and a mold temperature of 200° C. Such a resin composition has better injection moldability.

The resin composition of the disclosure preferably has a tensile strain at break of 1.0% or higher, more preferably 1.1% or higher. A tensile strain at break within the above range allows the resin composition to have better toughness.

The tensile strain at break can be measured through a tensile test using a type V specimen in conformity with ASTM D 638.

The resin composition of the disclosure can be molded into a molded article. Examples of the method for molding the resin composition include, but are not limited to, injection molding, extrusion molding, compression molding, blow molding, film molding, and wire coating extrusion. The resin composition of the disclosure has excellent fluidity and thus can be favorably molded by injection molding.

A molded article obtained by injection molding the resin composition of the disclosure is a favorable aspect of the disclosure.

The molded article may have any shape such as a sheet, a film, a rod, or a pipe.

The resin composition of the disclosure has excellent heat dissipation properties as well as excellent moldability and thus can be molded into various shapes for use in the fields requiring heat dissipation properties, such as the electrical and electronic device field, the automobile field, and the LED field. The resin composition is also applicable to electric wire coating materials, motor parts, motor insulators, LED lamp sockets, and parts for lithium-ion batteries.

EXAMPLES

The disclosure is specifically described with reference to examples, but the examples are not intended to limit the disclosure.

The properties in the examples and comparative examples were determined by the following methods.

MFR

The MFR was determined as the mass (g/10 min) of the polymer flowed out of a nozzle having an inner diameter of 2 mm and a length of 8 mm per 10 minutes in conformity with ASTM D1238 at a predetermined temperature (e.g., 372° C. for PFA and FEP and 297° C. for ETFE) and a predetermined load (e.g., 5 kg for PFA, FEP, and ETFE).

Thermal Conductivity

The thermal conductivity was calculated as a product of the thermal diffusivity, the specific heat capacity, and the density measured by the following methods.

Thermal Diffusivity

Device: Ai phase mobile 1 available from ai-Phase Co., Ltd.
Measurement temperature: 25° C.
Sample: 0.5-mm t plate obtained by press molding
The measurement was performed with N=3, and the average value was taken as the thermal diffusivity.

Conditions for Press Molding the Samples

Device: hot press machine IMC-11FA available from Imoto machinery Co., Ltd.
Molding temperature: 360° C.
Pressure: 10 MPa
Pressing time: 2 minutes Specific Heat Capacity The measurement was performed in conformity with JIS K 7123 and the value at 25° C. was taken as the specific heat capacity.

Density

The measurement was performed in conformity with JIS Z 8807.

Tensile Breaking Strain

The measurement was performed through a tensile test using a type V specimen in conformity with ASTM D 638.

Moldability for Injection Molding

The moldability was determined by whether or not the resin composition was molded into a specimen in conformity with ASTM D790. Injection molding was performed using a 15 t injection molding machine M26/15B available from Sumitomo Heavy Industries, Ltd., at a cylinder temperature of 380° C. and a mold temperature of 200° C.

The cases where the resin was molded into a specimen were evaluated as good. The cases where the resin was not molded into a specimen were evaluated as poor.

Particle Size Distribution of Boron Nitride Particles in Resin Composition

A nickel crucible was charged with 5-g pellets of the resin composition and was heated with an electric muffle furnace (FUW222PA available from Advantech) at 600° C. for two hours, whereby the resin was burned off to provide ash.

The resulting residue was subjected to measurement with a laser diffraction particle size distribution analyzer (RODOS T4.1, available from Sympatec GmbH) under the following conditions.

Measurement Conditions

Measurement range: R1 (0.18 to 35 μm)
Dispersion pressure: 3 bar

FEP: a tetrafluoroethylene/hexafluoropropylene copolymer, MFR=40 g/10 min

Boron Nitride

BN1: UHP-G1H available from Showa Denko K.K., aggregated boron nitride particles, average particle size 50 μm BN2: PTX60 available from Momentive, aggregated boron nitride particles, average particle size 55 to 65 μm BN3: MGP available from DENTCA, flaky boron nitride particles, average particle size 10 μm Example 1

A fluororesin (PFA1) in an amount of 60 parts by mass and boron nitride (BN1) in an amount of 40 parts by mass were melt kneaded to provide a resin composition. The melt kneading was performed at 380° C. with a biaxial extruder (MFU20TW available from Technovel Corporation). Boron nitride was fed from a side feeder. The resulting resin composition was evaluated. The results are shown in Table 1.

Examples 2 to 6 and Comparative Examples 1 and 2

Resin compositions were produced as in Example 1 except that the types and amounts of the fluororesin and boron nitride were changed as shown in Table 1, and were evaluated. The results are shown in Table 1.

TABLE 1

|  |  | Example 1 | Example 2 | Example 3 | Example 4 | Comparative Example 1 | Comparative Example 2 | Example 5 | Example 6 |
|---|---|---|---|---|---|---|---|---|---|
| Proportion (mass %) | PFA1 | 60 | 50 |  |  |  |  |  | 35 |
|  | PFA2 |  |  | 60 | 50 | 50 | 50 |  |  |
|  | FEP |  |  |  |  |  |  | 50 |  |
|  | BN1 | 40 | 50 | 40 | 50 |  |  | 50 | 65 |
|  | BN2 |  |  |  |  | 50 |  |  |  |
|  | BN3 |  |  |  |  |  | 50 |  |  |
| Particle size distribution of boron nitride particles | D10 (μm) | 0.8 | 0.8 | 0.9 | 0.9 | 0.9 | 1.1 | 1.0 | 0.6 |
|  | D50 (μm) | 2.6 | 2.5 | 2.6 | 2.6 | 3.2 | 4.5 | 2.9 | 2.4 |
|  | D90 (μm) | 5.8 | 5.4 | 5.9 | 5.9 | 10.2 | 15.8 | 6.0 | 5.2 |
|  | Max (μm) | 29.4 | 29.4 | 29.4 | 29.4 | 29.4 | 29.4 | 29.4 | 29.4 |
|  | Proportion of 14.6 to 20.6 μm particles (%) | 0.74 | 0.06 | 0.7 | 0.92 | 5.77 | 9.83 | 0.9 | 0.4 |
|  | Proportion of 24.6 to 29.4 μm particles (%) | 1.09 | 0.17 | 0.84 | 1.11 | 1.11 | 11.69 | 1.3 | 0.9 |
|  | (Proportion of 24.6 to 9.4 μm particles)/(proportion of 14.6 to 20.6 μm particles) | 1.5 | 2.8 | 1.2 | 1.2 | 0.2 | 1.2 | 1.4 | 2.3 |
| Evaluation of composition | Thermal conductivity (W/m · K) | 2.6 | 3.0 | 2.6 | 3.6 | 4.3 | 2.4 | 2.4 | 4.4 |
|  | MFR (g/10 min) | 16.0 | 6.0 | 11.0 | 8.1 | 0.1 | 3.5 | 10.0 | 5.0 |
|  | Tensile strain at break (%) | 1.8 | 1.2 | 1.6 | 1.1 | 0.4 | 0.6 | 1.9 | 1.0 |
|  | Injection moldability | Good | Good | Good | Good | Poor | Poor | Good | Good |

Sample amount: 1 g

The following raw materials were used in the examples and comparative examples.

Fluororesin

PFA1: a tetrafluoroethylene/perfluoro(alkyl vinyl ether) copolymer, MFR=72 g/10 min PFA2: a tetrafluoroethylene/perfluoro(alkyl vinyl ether) copolymer, MFR=28 g/10 min

The invention claimed is:

1. A resin composition comprising a fluororesin and boron nitride particles, the fluororesin being present in an amount of 35 to 70% by mass and the boron nitride particles being present in an amount of 30 to 65% by mass, each relative to the resin composition, the resin composition having a melt flow rate of 5.0 g/10 min or more, wherein the boron nitride particles have a 90% particle size (D90) of 5.0 μm to 9.0 μm.

2. The resin composition according to claim 1, wherein the boron nitride particles have a ratio of a proportion (b) of particles having a particle size of 24.6 to 29.4 μm to a proportion (a) of particles having a particle size of 14.6 to 20.6 μm ((b)/(a)) of 1.0 or higher.

3. The resin composition according to claim 1, wherein the boron nitride particles include particles having a particle size of 14.6 to 20.6 μm in a proportion (a) of 5.0% or less.

4. The resin composition according to claim 1, wherein the boron nitride particles include particles having a particle size of 24.6 to 29.4 μm in a proportion (b) of 10.0% or less.

5. The resin composition according to claim 1, wherein the fluororesin is a melt-fabricable fluororesin.

6. The resin composition according to claim 1, wherein the fluororesin includes at least one selected from the group consisting of a tetrafluoroethylene/perfluoro (alkyl vinyl ether) copolymer, a tetrafluoroethylene/hexafluoropropylene copolymer, and an ethylene/tetrafluoroethylene copolymer.

7. The resin composition according to claim 1, wherein the resin composition has a thermal conductivity of 1.5 W/m·K or higher.

8. The resin composition according to claim 1, wherein the resin composition has a tensile strain at break of 1.0% or higher.

9. A molded article obtained by injection molding the resin composition according to claim 1.

* * * * *